United States Patent
Evans et al.

(10) Patent No.: US 11,117,651 B2
(45) Date of Patent: Sep. 14, 2021

(54) AIRCRAFT ASSEMBLY ACTUATION SYSTEM

(71) Applicants: SAFRAN LANDING SYSTEMS UK LTD, Gloucester (GB); SAFRAN LANDING SYSTEMS, Vélizy-Villacoublay (FR)

(72) Inventors: Roy Evans, Gloucester (GB); Olivier Collet, Gloucester (GB); Jean Philippe Vaslin, Gloucester (GB)

(73) Assignees: Safran Landing Systems UK LTD; Safran Landing Systems

( * ) Notice: Subject to any disclaimer, the term of this patent is extended or adjusted under 35 U.S.C. 154(b) by 282 days.

(21) Appl. No.: 16/190,935

(22) Filed: Nov. 14, 2018

(65) Prior Publication Data
US 2019/0152589 A1 May 23, 2019

(30) Foreign Application Priority Data

Nov. 21, 2017 (EP) .................................... 17202886

(51) Int. Cl.
*B64C 25/24* (2006.01)
*B64C 25/22* (2006.01)
(Continued)

(52) U.S. Cl.
CPC .............. *B64C 25/24* (2013.01); *B64C 13/42* (2013.01); *B64C 25/20* (2013.01); *B64C 25/22* (2013.01);
(Continued)

(58) Field of Classification Search
CPC ......... B64C 13/42; B64C 25/20; B64C 25/22; B64C 25/26; B64D 45/0005
See application file for complete search history.

(56) References Cited

U.S. PATENT DOCUMENTS

| | | | |
|---|---|---|---|
| 6,854,689 B1* | 2/2005 | Lindahl ................... | B64C 25/16 244/102 R |
| 7,338,012 B2* | 3/2008 | Rouyre ................... | B64C 25/16 244/102 A |

(Continued)

FOREIGN PATENT DOCUMENTS

| | | |
|---|---|---|
| EP | 2130765 A2 | 12/2009 |
| EP | 2444317 A1 | 4/2012 |

(Continued)

OTHER PUBLICATIONS

Extended European Search Report for European Application No. 17202886.2, dated Mar. 19, 2018—10 pages.

*Primary Examiner* — Brian M O'Hara
*Assistant Examiner* — Keith L Dixon
(74) *Attorney, Agent, or Firm* — RatnerPrestia

(57) ABSTRACT

An aircraft assembly, having: a reference component; a first component and a first actuator, the first actuator configured to move the first component relative to the reference component; a second component and a second actuator, the second actuator configured to move the second component relative to the reference component; a position sensor configured to measure a position of the first component, and to output a position value, the sensor being capable of outputting a plurality of non-zero position values; and a controller configured to control the movement of the second component by the second actuator based at least partially on the position value output by the position sensor.

19 Claims, 8 Drawing Sheets

(51) Int. Cl.
*B64C 25/26* (2006.01)
*B64C 13/42* (2006.01)
*B64D 45/00* (2006.01)
*B64C 25/20* (2006.01)

(52) U.S. Cl.
CPC .......... *B64C 25/26* (2013.01); *B64D 45/0005* (2013.01)

(56) References Cited

U.S. PATENT DOCUMENTS

| | | | | |
|---|---|---|---|---|
| 7,944,372 | B2* | 5/2011 | Gouette | B64C 25/58 340/960 |
| 8,175,762 | B2* | 5/2012 | Trotter | B64C 25/26 701/16 |
| 8,616,495 | B2 | 12/2013 | Ernis et al. | |
| 8,967,535 | B2* | 3/2015 | Way | B64C 25/12 244/102 R |
| 9,221,556 | B2* | 12/2015 | Herbert | B64C 25/28 |
| 2018/0002000 | A1* | 1/2018 | Hagihara | F15B 11/04 |
| 2019/0002091 | A1* | 1/2019 | Tangye | B64C 25/26 |
| 2019/0359326 | A1* | 11/2019 | Marles | B64D 45/0005 |
| 2020/0031457 | A1* | 1/2020 | Alley | B64C 25/60 |

FOREIGN PATENT DOCUMENTS

| | | | |
|---|---|---|---|
| EP | 3239043 | A1 | 11/2017 |
| WO | 2005077757 | A1 | 8/2005 |
| WO | 2016210265 | A1 | 12/2016 |

* cited by examiner

AIRCRAFT ASSEMBLY ACTUATION SYSTEM

This application claims the benefit of and priority to European Application No. EP17202886.2, filed on Nov. 21, 2017, the contents of which are incorporated herein by reference.

BACKGROUND OF THE INVENTION

An aircraft can include multiple components which move to define swept volumes which at least partially overlap.

The present inventors have devised a new aircraft assembly control architecture which can enable an assembly to move between first and second operational configurations more quickly and/or with reduced power requirement.

SUMMARY OF THE INVENTION

A first aspect of the invention provides an aircraft assembly, comprising: a reference component; a first component and a first actuator, the first actuator being arranged to move the first component relative to the reference component; a second component and a second actuator, the second actuator being arranged to move the second component relative to the reference component; a position sensor arranged to measure a position of the first component, and to output a position value, the sensor being capable of outputting a plurality of non-zero position values; and a controller arranged to control the movement of the second component by the second actuator based at least partially on the position value output by the position sensor.

A second aspect of the invention provides an aircraft assembly substantially identical to the first aspect except that the position sensor of the first aspect is replaced by a speed sensor arranged to measure a speed of the first component, and to output a speed value, with the controller being arranged to control the movement of the second component by the second actuator based at least partially on the speed value output by the speed sensor.

With the arrangement described in the first and second aspects, there is provided an aircraft assembly which can be operated such that the overall actuation time is reduced.

In the first aspect, the controller can be arranged to calculate a speed of movement of the first component from the position value, using a time measured by an internal clock and can be arranged to control the movement of the second component by the second actuator based at least partially on the calculated speed of movement. With such an arrangement, the actuation of the aircraft assembly can be optimized further to further reduce the overall actuation time.

Similarly, in the second aspect, the controller can be arranged to calculate a position of the first component from the speed value and can be arranged to control the movement of the second component by the second actuator based at least partially on the calculated position.

With such an arrangement, the position of the first component can be used for determining an actuation of the second component without the use of an extra sensor.

In the first aspect, the aircraft assembly can further comprise a speed sensor arranged to measure a speed of the first component, and to output a speed value, and the controller can be arranged to control the movement of the second component by the second actuator based at least partially on the speed value output by the speed sensor. With such an arrangement, the aircraft assembly can be operated more reliably than previously known assemblies.

In the first aspect, the first component can move relative to the reference component in a rotational manner and the plurality of non-zero positions can be separated by 1° or less, optionally 0.1° or less. With such an arrangement, the higher precision of the sensor allows a reduced actuation time.

In either the first aspect or the second aspect, the first and second components can be actuatable with independently variable non-zero speeds. With such an arrangement, the aircraft assembly can be actuated in a more customizable way such that it can adapt to changeable conditions better.

In the first or second aspect, the first and second components can have swept volumes which at least partially coincide. With such an arrangement, the sensors and control system can function in order to prevent clashes of components.

In either the first or second aspect, the first and second actuators can be first and second electrohydraulic actuators. With such an arrangement, the actuators should have increased longevity and reduced dither than previously known assemblies.

The first and second electrohydraulic actuators can have independent fluid circuits. With such an arrangement, there is no requirement for the aircraft to have a centralized hydraulics fluid circuit and so the overall aircraft weight can be reduced.

The first electrohydraulic actuator can have a first motor and a first pump and the second electrohydraulic actuator can have a second motor and a second pump. With such an arrangement, the actuators of the assembly are entirely separate such that failure of one would not necessarily impinge on the operation of the other.

The first and second actuators can alternatively be electromechanical actuators. With such an arrangement, the movements of the first and second components can be more controllable.

The aircraft assembly can be a landing gear assembly.

According to a third aspect of the present invention, there is provided a method of operating an aircraft assembly, comprising: moving a first component relative to a reference component with a first actuator; measuring a plurality of non-zero values of the position of the first component with a sensor and outputting a plurality of position values; receiving the position values with a controller; outputting a command with the controller to move a second component with a second actuator; the command being based at least partially on the received position values; and moving the second component with the second actuator.

With such an arrangement, there is provided a method of operating an aircraft component more efficiently.

The command can be based at least partially on a speed of movement of the first component. This speed can be measured directly using a speed sensor or calculated by the controller based on the position values. With such an arrangement, the method of moving the aircraft assembly can be carried out with a higher precision.

According to a fourth aspect of the invention, there is provided a method according to the third aspect, except that the measuring of a plurality of non-zero values of the position of the first component can be substituted for measuring a speed of the first component with a sensor and outputting a speed value.

Any of the above-mentioned limitations regarding the first and/or second aspects of the invention can equally be applied to the method of the third or fourth aspect.

While the terms speed sensor and position sensor are used above, it will be understood to the skilled person that any sensor or sensing device can be used including devices such as revolution counters which are embedded within the actuators themselves.

Further, any sensor and processor combination which leads to the output of a position or speed value can be considered to be a position or speed sensor respectively. For example, an accelerometer or jerkmeter and numerical integrator can be used to derive a speed value or a position value. Such an arrangement would be considered to constitute a speed sensor or a position sensor respectively.

It will also be understood that any combination of electromechanical and electrohydraulic actuators can be used. For example, where the first actuator is electromechanical and the second actuator is electrohydraulic or vice versa.

Further, while the term "electrohydraulic actuator" is used throughout this specification, the term "electro hydrostatic actuator" could equally be used. The two terms are considered to be equivalent for the purposes of this disclosure.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
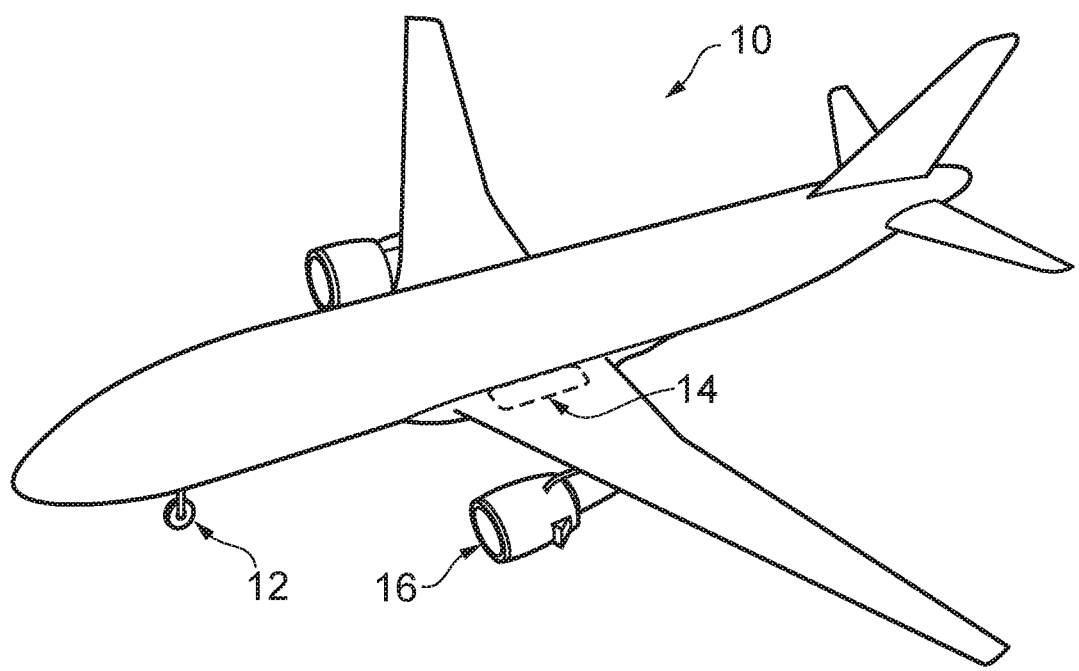
FIG. 1 is a diagram of an aircraft.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Referring now to FIGS. 2a to 2e, an aircraft assembly, namely an aircraft landing gear assembly, is shown generally at 14. The landing gear assembly 14 includes a foldable stay 18, a lock link 20 and a down lock spring assembly 22 mounted to the stay 18 and arranged to urge the lock link 20 to assume a locked state. The landing gear assembly also includes a main shock absorber strut 24, comprising a main fitting 26 and a sliding tube 28, as well as a wheel and brake assembly 30.

The aircraft landing gear assembly is movable between a deployed condition, for take-off and landing, and a stowed condition for flight. An actuator (not shown) is provided for moving the landing gear between the deployed condition and the stowed condition. This actuator is known in the art as a retraction actuator, and more than one can be provided. A retraction actuator can have one end coupled to the airframe and another end coupled to the main strut such that extension and retraction of the actuator results in movement of the main strut between deployed and stowed conditions.

Figure 2A:
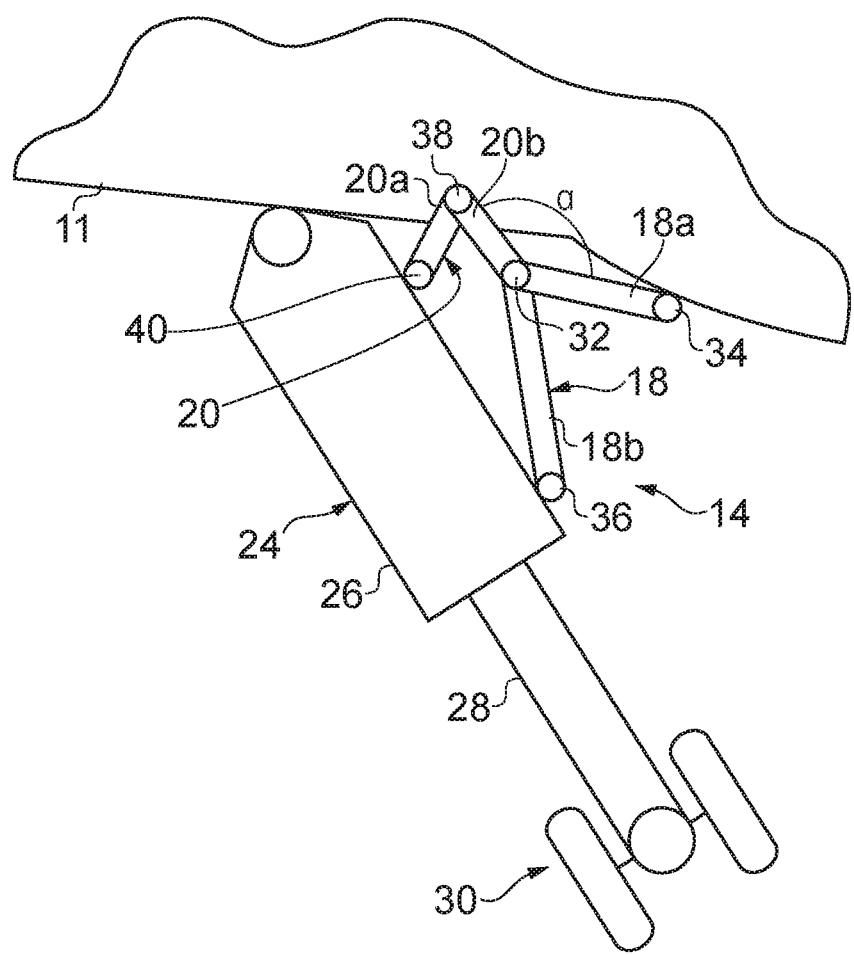
FIGS. 2a to 2e are diagrams an aircraft landing gear assembly.

The stay 18 serves to support the orientation of the main fitting 26 when the landing gear is in the deployed condition. The stay 18 generally includes a two bar linkage that can be unfolded to assume a generally straight or aligned, over center condition in which the stay 18 is locked to inhibit movement of the main fitting, as shown in FIGS. 2c and e. When the stay is broken, it no longer prevents pivotal movement of the main fitting 26 and the main fitting 26 can be moved by the retraction actuator towards the stowed condition, as shown in FIG. 2a. During flight the stay 18 is arranged in the folded condition, while during take-off and landing the stay 18 is arranged in the generally straight or aligned condition. Some main landing gear assemblies include a pair of stays coupled to a common shock absorbing strut.

The stay 18 has an elongate upper stay arm 18a having a lower end defining a pair of lugs pivotally coupled via a pivot pin 32 to a pair of lugs defined at an upper end of an elongate lower stay arm 18b. The stay arms 18a and 18b can therefore pivotally move relative to one another about the pivot pin 32. The upper end of the upper stay arm 18a defines a pair of lugs that are pivotally coupled to a lug of a connector 34 which in turn is pivotally coupled to the airframe 11. The lower end of the lower stay arm 18b defines a pair of lugs pivotally coupled to a lug of a connector 36 which in turn is pivotally coupled to the main fitting 26.

The lock link 20 has an elongate upper link arm 20a having a lower end pivotally coupled to an upper end of an elongate lower link arm 20b via a pivot pin 38. The link arms 20a, 20b can therefore pivotally move relative to one another about the pivot pin 38. An upper end of the upper link arm 20a defines a pair of lugs that are pivotally coupled to a lug of a connector 40 which in turn is pivotally coupled to the main strut 26. A lower end of the lower link arm 20b defines a lug that is pivotally coupled to lugs of the stay arms 18a, 18b via the pivot pin 32. Lugs of the upper stay arm 18a are disposed between the lugs of the lower stay arm 18b and the lugs of the lower link arm 20b.

Figure 2B:
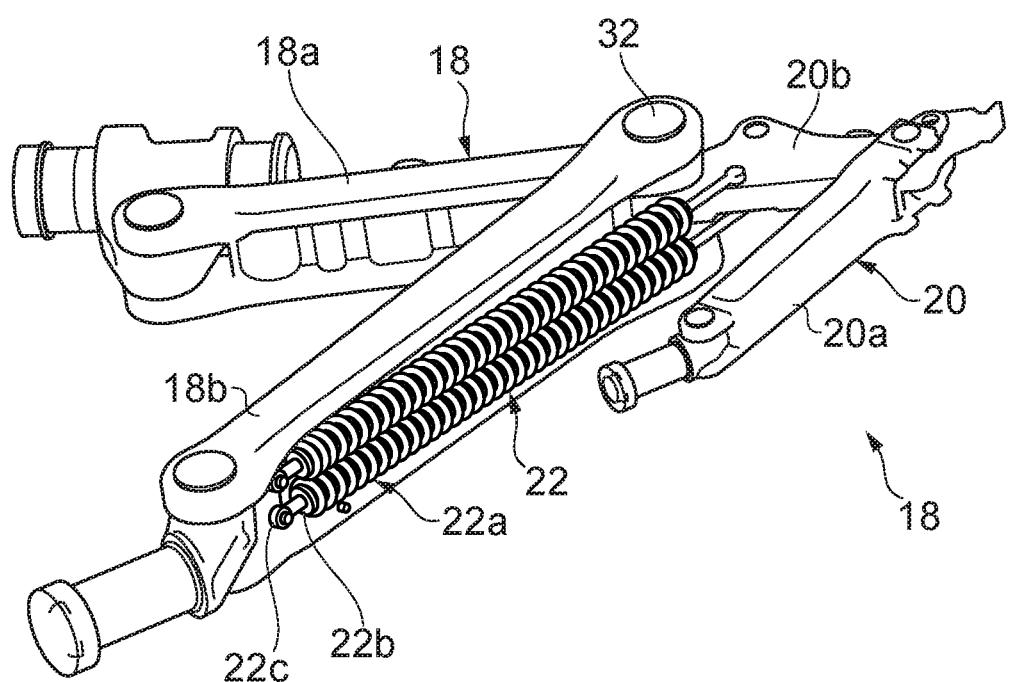
Figure 2C:
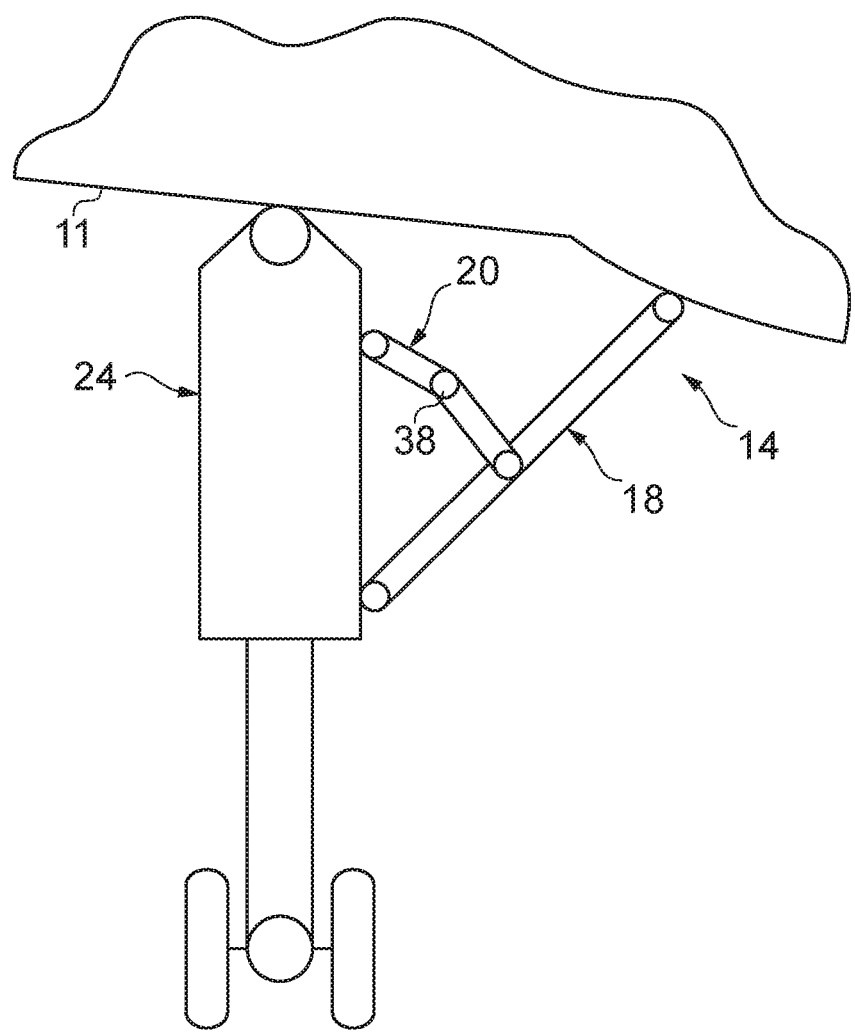
Figure 2D:
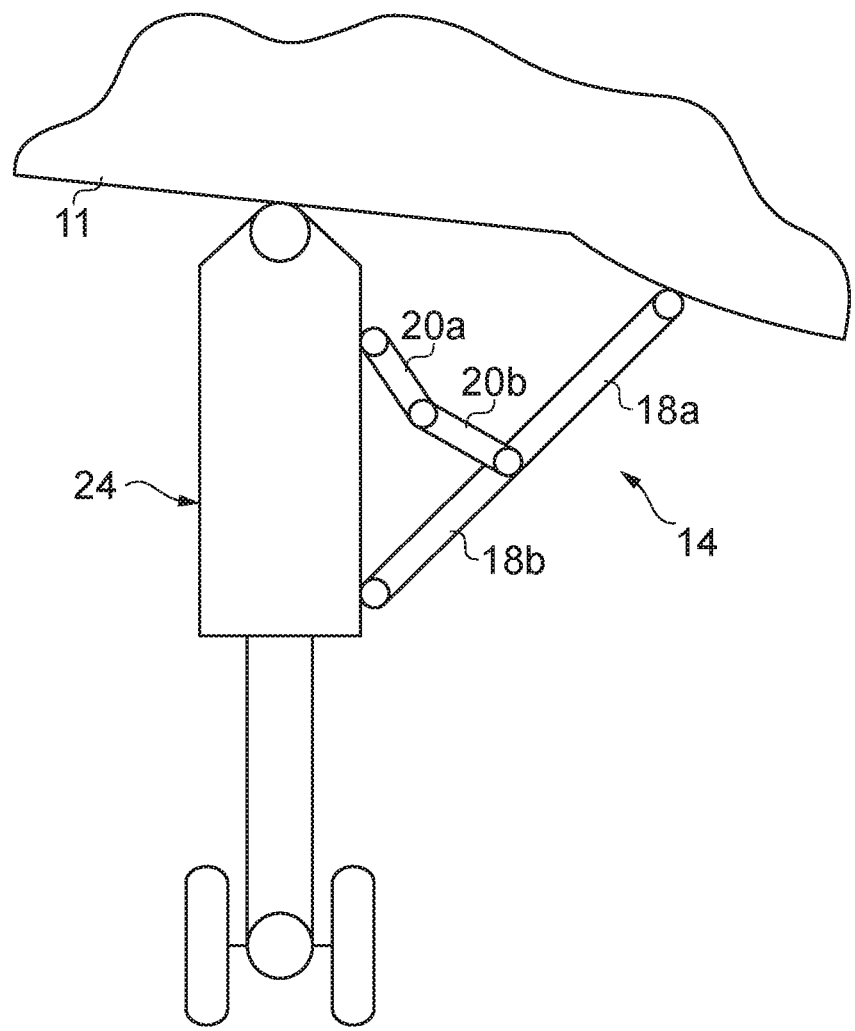

When the lock link 20 is in the locked condition, as illustrated in FIG. 2d, e, the upper and lower link arms 20a, 20b are generally longitudinally aligned or coaxial, and can be 'over-center', such that the lock link 20 is arranged to oppose a force attempting to fold the stay 18, so as to move the landing gear assembly from the deployed condition towards the stowed condition. The lock link 20 must be broken to enable the stay 18 to be folded, thereby permitting the main fitting 26 to be moved by the retraction actuator towards the stowed condition.

One or more down lock springs 22 are generally provided to assist in moving the landing gear assembly to the deployed condition and locking it in that state by making the lock link. Down lock springs 22 also inhibit the lock link accidentally being unlocked. Down lock springs 22 are generally titanium alloy coil springs, which can be coupled between the lock link and another part of the landing gear assembly, such as an arm of the stay assembly, as shown in FIGS. 2b and 2e.

The spring assembly 22 is arranged to bias the lock link 20 towards the locked condition by way of spring tension. A distal end of the spring 22a is coupled to the lower stay arm 18b via a lower engagement formation 22b which in turn is coupled to an anchor point defined by the lower connector 22c.

Figure 2E:
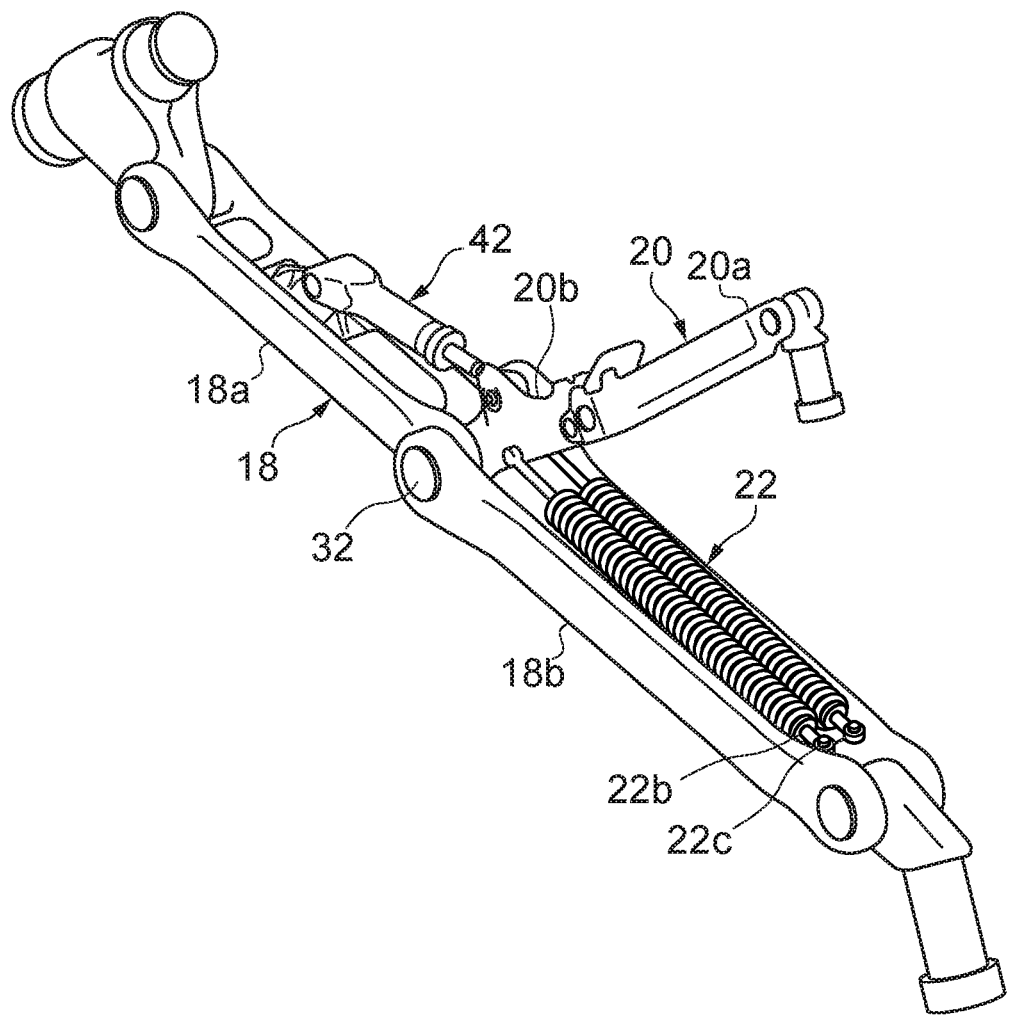

The coil spring of the spring assembly 26 is at its shortest when the landing gear assembly is in the deployed condition, as shown in FIG. 2e, and at its longest when the landing gear assembly approaches the stowed condition, as shown in FIG. 2b. As the landing gear assembly is retracted towards the stowed condition, the spring of each spring assembly extends, resulting in increased spring load and torsional stress.

Referring to FIG. 2e, a lock stay actuator 42 is coupled between the upper stay arm 18a and lower link arm 20b and arranged to pivotally move the link arms 20a, b so as to 'lock' and 'unlock' the lock link 20, as illustrated in FIG. 2c. The actuator 42 can break the lock link 20 against the down lock spring bias, allowing the landing gear assembly to be folded and stowed as described previously.

As will be appreciated from the above, various aircraft assemblies include a first part which is movable relative to a second part. When such an arrangement is present, an actuator is required in order to move the first part relative to the second part. Often, multiple actuators must cooperate when moving several different parts in order to avoid a clash of parts or a "force fight" where two actuators oppose the movement of each other.

For example, in the case of a landing gear assembly, actuators can be used to operate the landing gear doors, the main landing gear unit and the landing gear lock link. In use, it is important that the actuators only move their respective components at a time when such a movement is facilitated by the movement of the other components. A landing gear main strut can only be deployed once the landing gear doors are substantially open, and can only be retracted once the lock link has been broken.

When such components are operating, a limit switch can be used in order to determine whether a first component has reached a certain point. Actuation of the second component can then begin only once this predetermined point has been reached. Such limit switches give a binary output dependent on whether the required condition has been met.

Some aircraft assemblies cannot be optimized to actuate as quickly as possible or as efficiently as possible at least partially due to large safety factors which are required when actuating two different components whose operation might conflict with each other.

Figure 3:
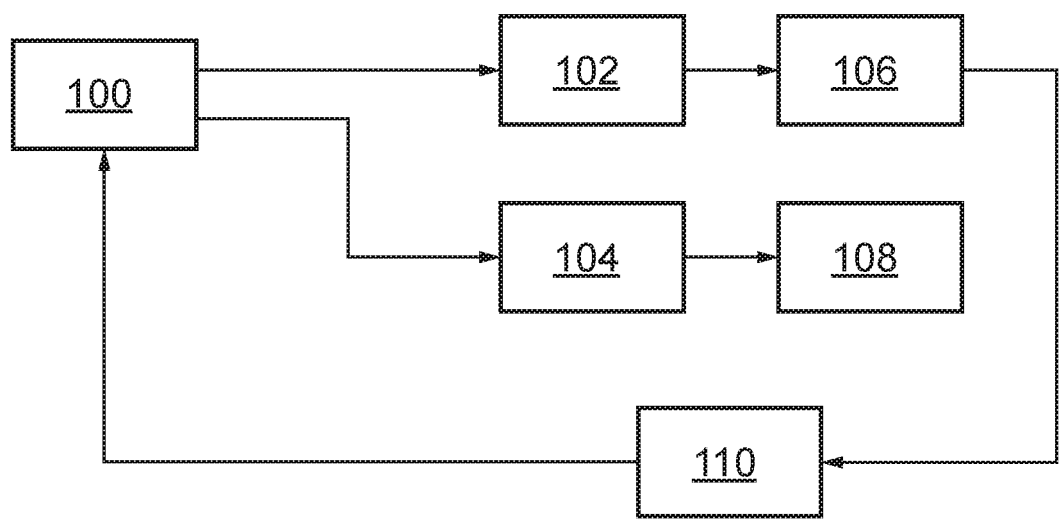
FIG. 3 is a schematic view of an aircraft assembly actuation system.

FIG. 3 is a system diagram of an aircraft assembly actuation system. The system is controlled by a controller 100. The controller 100 receives inputs from the pilot or a central control system and commands a first actuator 102 to move a first component 106.

A sensor 110 detects movement of the first component 106. Specifically, the sensor determines the position of the first component 106 to a resolution which includes at least two limit positions and one intermediate position. Optionally, the sensor 110 can monitor the position to a resolution including 10 or 100 intermediate positions. The resolution can be sufficiently high that the sensing of the first component 106 can be considered continuous.

The sensor 110 then outputs a position value to the controller 100. The position value can be non-binary, for example it can be given in 1% increments, indicating that the first component 106 is in a position from 0% actuated to 100% actuated.

Based on the position value received from the sensor 110, the controller 100 determines whether a second component 108 should move. If the second component 108 should move, the controller 100 provides an output command to a second actuator 104 and the second actuator 104 moves the second component 108.

The output commands given by the controller 100 to the first and/or second actuators 102, 104 can be non-binary commands, indicating that the first and/or second actuators 102, 104 should move the first and/or second components 106, 108 at any speed between not moving and the maximum possible speed for the actuator. A certain speed can be selected in order to reduce the peak power required or to minimize the overall actuation time for the assembly.

While FIG. 3 shows only a single sensor, it is noted that the system could be varied in order to provide a second sensor which measures a position of the second component 108 and provides a position value to the controller 100 for synchronizing the movements of the first component 106 and the second component 108. Likewise, the system can comprise more than two components, each having an actuator and, optionally, a sensor.

Figure 4:
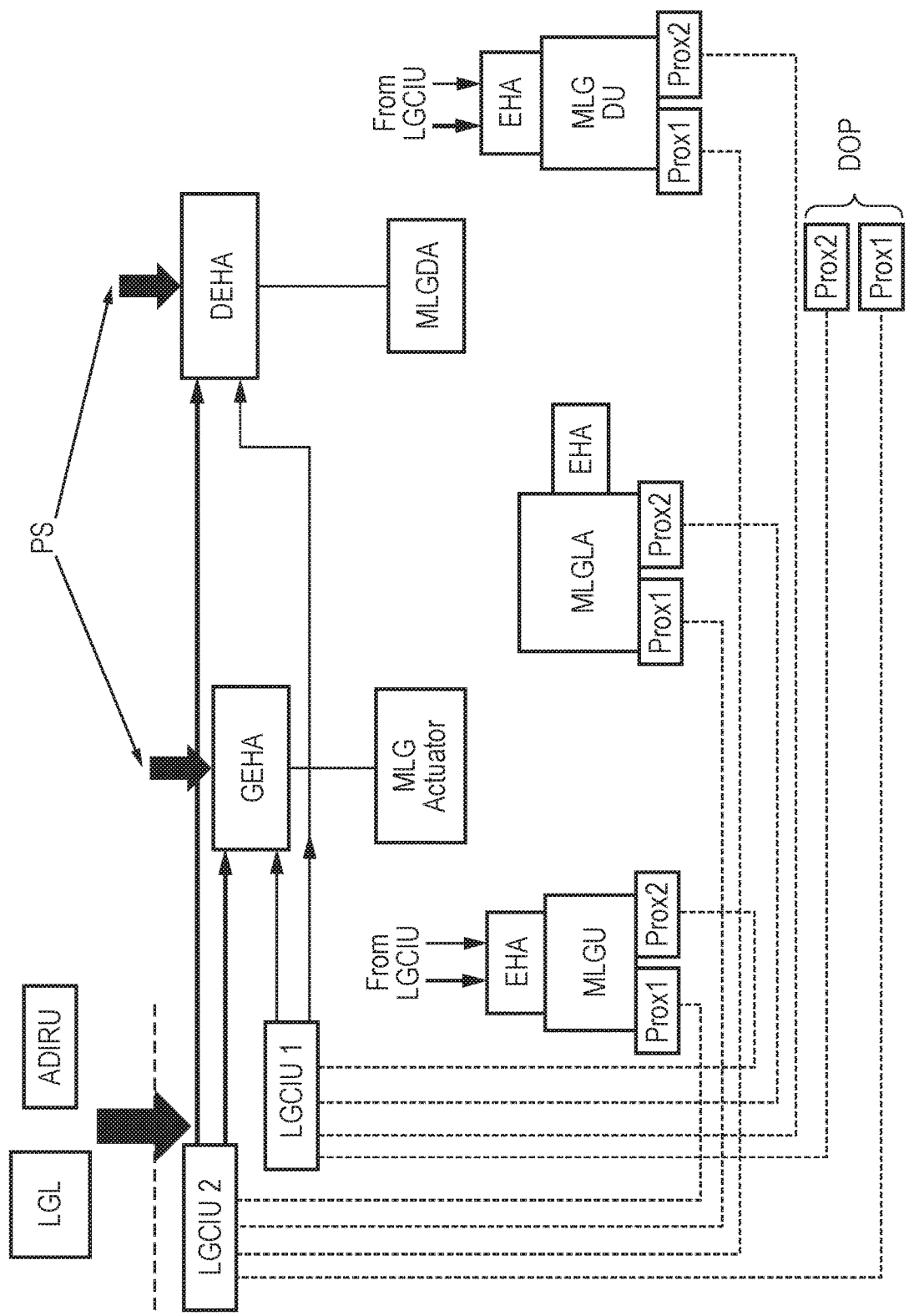
FIG. 4 is a schematic showing an example landing gear circuitry.

FIG. 4 shows a schematic control system which can be employed in order to ensure the proper functioning of a landing gear assembly.

Landing gear control interface units LGCIU 1, LGCIU 2 receive inputs from a landing gear lever LGL and an air data inertial reference unit ADIRU in order to determine whether the landing gear should be deployed.

Based on commands from the landing gear lever LGL and air data inertial reference unit ADIRU, the landing gear control interface units LGCIU1, LGCIU2 outputs commands to the gear electrohydraulic actuator GEHA and door electrohydraulic actuator DEHA. The gear electrohydraulic actuator GEHA and door electrohydraulic actuator DEHA are powered by a power source PS.

The gear electrohydraulic actuator GEHA and door electrohydraulic actuator GEHA move the main landing gear unit MLGU and main landing gear door MLGDU respectively.

The movements of various components such as the main landing gear unit MLGU, the main landing gear lockstay actuator MLGLA and the main landing gear door unit MLGDU are measured by respective sensors Prox1, Prox2. An extra pair of sensors Prox1 and Prox2 can also monitor the door open position SOP.

Outputs from the sensors Prox1, Prox2 are then fed back into the landing gear control interface unit LGCIU so that further movements of all of the components can be synchronized. While the above disclosure used a landing gear control interface unit, a remote electronics unit with bidirectional communication to the landing gear lever LGL could equally be employed.

While the above disclosure focuses on a landing gear assembly, the principles of the above control system could equally be applied to other assemblies which are within an aircraft, such as flaperons.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly, comprising:
 a main strut configured to support a weight of an aircraft on the ground;
 a reference component;

a first component and a first actuator, the first actuator being configured to move the first component relative to the reference component;

a second component and a second actuator, the second actuator being configured to move the second component relative to the reference component;

a position sensor configured to measure a position of the first component, and to output a position value, the sensor being configured to output a plurality of non-zero position values; and a controller configured to control the movement of the second component by the second actuator based at least partially on the plurality of non-zero position values output by the position sensor.

2. An aircraft landing gear assembly, comprising:

a main strut configured to support a weight of an aircraft on the ground;

a reference component;

a first component and a first actuator, the first actuator being configured to move the first component relative to the reference component;

a second component and a second actuator, the second actuator being configured to move the second component relative to the reference component;

a speed sensor configured to measure a speed of the first component, and to output a speed value; and a controller configured to control the movement of the second component by the second actuator based at least partially on the speed value output by the speed sensor.

3. The aircraft landing gear assembly of claim 1, wherein the controller is configured to calculate a speed of movement of the first component from the position value and is configured to control the movement of the second component by the second actuator based at least partially on the calculated speed of movement.

4. The aircraft landing gear assembly of claim 2, wherein the controller is configured to calculate a position of the first component from the speed value and is configured to control the movement of the second component by the second actuator based at least partially on the calculated position.

5. The aircraft landing gear assembly of claim 1, further comprising a speed sensor configured to measure a speed of the first component, and to output a speed value, and wherein the controller is configured to control the movement of the second component by the second actuator based at least partially on the speed value output by the speed sensor.

6. The aircraft landing gear assembly of claim 1, wherein the first component moves relative to the reference component in a rotational manner and the plurality of non-zero positions are separated by 1 degree or less.

7. The aircraft landing gear assembly of claim 1, wherein the first and second components are actuatable with independently variable non-zero speeds.

8. The aircraft landing gear assembly of claim 2, wherein the first and second components are actuatable with independently variable non-zero speeds.

9. The aircraft landing gear assembly of claim 1, wherein the first and second components have swept volumes which at least partially coincide.

10. The aircraft landing gear assembly of claim 2, wherein the first and second components have swept volumes which at least partially coincide.

11. The aircraft landing gear assembly of claim 1, wherein the first and second actuators are first and second electrohydraulic actuators respectively.

12. The aircraft landing gear assembly of claim 11, wherein the first and second electrohydraulic actuators have independent fluid circuits.

13. The aircraft landing gear assembly of claim 11, wherein the first electrohydraulic actuator has a first motor and a first pump and the second electrohydraulic actuator has a second motor and a second pump.

14. The aircraft landing gear assembly of claim 2, wherein the first and second actuators are first and second electrohydraulic actuators respectively.

15. The aircraft landing gear assembly of claim 14, wherein the first and second electrohydraulic actuators have independent fluid circuits.

16. The aircraft landing gear assembly of claim 14, wherein the first electrohydraulic actuator has a first motor and a first pump and the second electrohydraulic actuator has a second motor and a second pump.

17. The aircraft landing gear assembly of claim 1, wherein the first and second actuators are electromechanical actuators.

18. The aircraft landing gear assembly of claim 2, wherein the first and second actuators are electromechanical actuators.

19. A method of operating an aircraft landing gear assembly, the method comprising:

moving a first component relative to a reference component with a first actuator;

measuring a plurality of non-zero values of the position and/or speed of the first component with a sensor and outputting a plurality of position and/or speed values;

receiving the position and/or speed values with a controller;

outputting a command with the controller to move a second component with a second actuator, the command being based at least partially on the received plurality of non-zero position and/or speed values; and moving the second component with the second actuator.

* * * * *